UNITED STATES PATENT OFFICE.

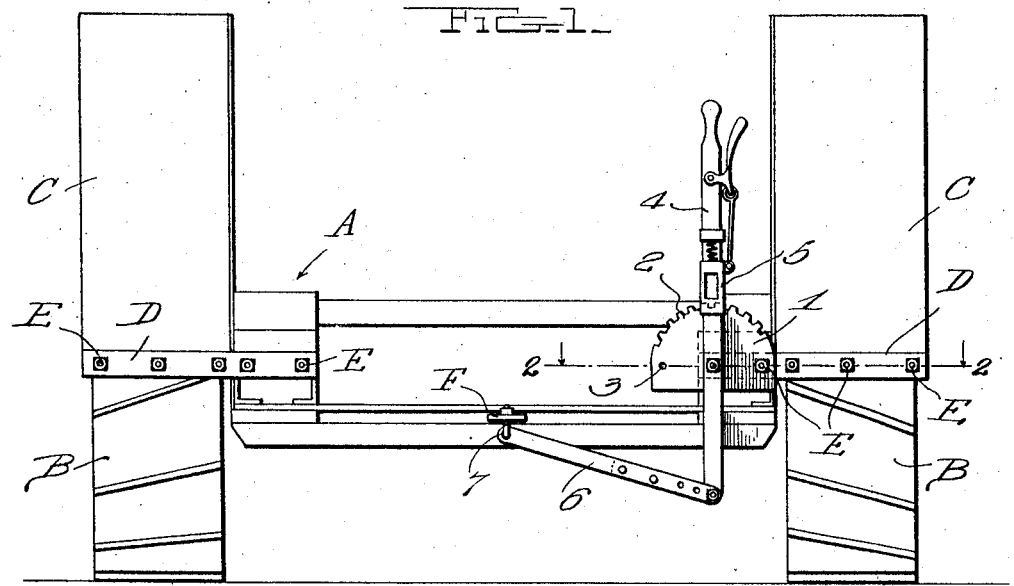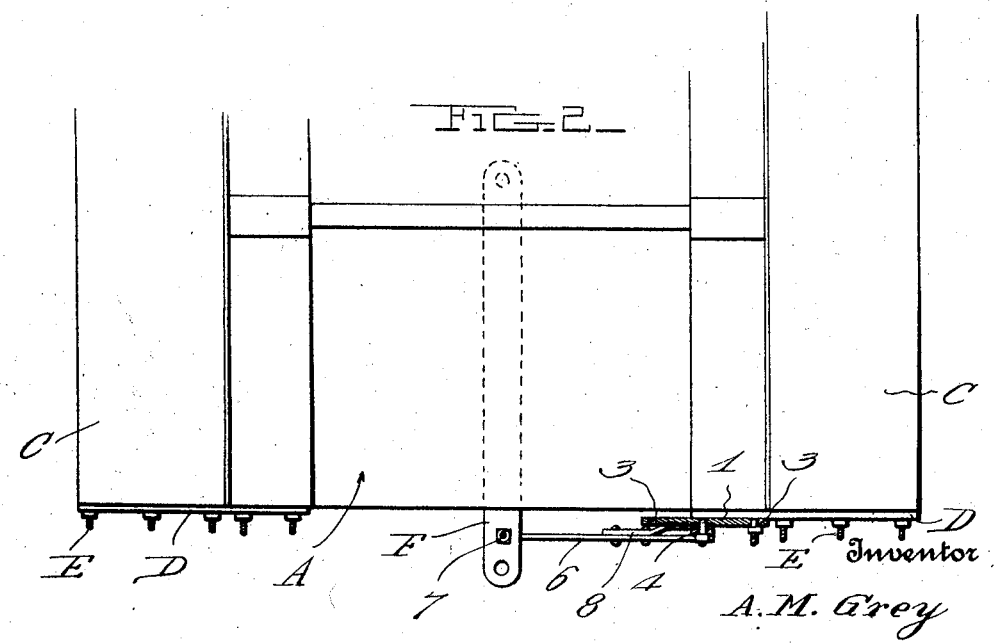

ALEXANDER M. GREY, OF PEEVER, SOUTH DAKOTA.

TRACTOR ATTACHMENT.

1,333,171. Specification of Letters Patent. Patented Mar. 9, 1920.

Application filed July 10, 1919. Serial No. 309,870.

*To all whom it may concern:*

Be it known that I, ALEXANDER M. GREY, a citizen of the United States, residing at Peever, in the county of Roberts and State of South Dakota, have invented certain new and useful Improvements in Tractor Attachments; and I do declare the following to be a full, clear, and exact description of the invention, such as will enable others skilled in the art to which it appertains to make and use the same.

This invention relates to improvements in implement shifters, particularly to that type adapted for attachment to a tractor.

Heretofore, in attaching implement shifters to tractors, it has been necessary to cut away part of the tractor or make other alterations in order to apply the shifter so that it would efficiently work, and it is the primary object of this invention to provide a simple and practical device of this character which may be readily attached to a tractor without remodeling or altering in the least the original design of the tractor.

With the above and other objects in view the invention consists of the novel features of construction and in the combination and arrangement of parts as will be hereinafter fully described and claimed.

I attain these objects by the mechanism illustrated in the accompanying drawing, in which:—

Figure 1 is a rear elevation of a portion of a tractor illustrating the application of my draw bar shifters; and, Fig. 2 is a sectional view taken on the plane of line 2—2 of Fig. 1.

Similar numerals refer to similar parts throughout the several views.

The tractor illustrated is of the Heider type and includes a frame A, mounted on wheels B, and having the wheel fenders C secured in place by means of transverse bars D which are connected to the fenders and frame by bolts E. A movable draw bar F is pivotally connected to the frame of the tractor as shown in Fig. 2.

The shifter comprises a segmental locking rack 1 having a plurality of notches 2 in its curved edge, said segment preferably being provided with a centrally disposed bolt hole and with additional holes 3 on each side. The central hole and one of the side holes are adapted to receive a pair of the bolts E, preferably those on the tractor frame.

The bolt received in the central hole is passed through an opening in a hand lever 4, said opening being formed at a point substantially midway the length of the lever. The lever 4 carries on its upper portion a slidable collar 5 on the lower end of which is a lug or pawl adapted for engagement with the notches 2 in said segment, said collar and pawl being retractable by means of a handle pivotally connected to the lever, and connected to the collar by a link or rod. The pawl is normally pressed into one of the notches by a coil spring or the like disposed between the upper end of the collar 5 and a stop which is secured to the lever at a point above said collar.

Pivotally connected at one end to the lower end of the lever 4 is a link or bar 6 which is provided at its opposite end with an opening perforated to receive the eye of an eye bolt 7 to secure the link to the draw bar F. Extending parallel with and spaced from the bar or link 6, is a short bar 8 which has one end bent inwardly and secured to said link, said bars forming a fork which straddles the lower end of the lever 4. The bars are preferably provided with a series of transversely alined apertures whereby adjustment of the bars is made possible.

With the construction set forth it is apparent that the device may be applied with equally good results, to either side of the frame through the simple operation of removing the nuts from the two bolts used for securing the inner ends of the transverse bars to the frame of the tractor. I am aware of the fact that devices of this character have been patented, but have no knowledge of anyone conceiving such a device which embraces the simple construction and which may be attached to either side of a tractor by the simple operation set forth in the foregoing description.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim:—

The combination with a tractor including a frame, fenders, a pair of horizontally disposed bars, each bar being secured to a fender and having one end extending transversely of the frame and secured to the frame by a pair of bolts extending longitudinally with respect to the frame and a pivoted draw bar on said frame; of a vertical transverse plate, said plate having a curved toothed upper edge and a plurality of horizontally spaced bolt-holes near its lower edge, one of said bolt-holes being disposed centrally with respect to the plate, the central hole and one adjacent hole receiving one pair of said bolts, a lever pivoted between its ends to the bolts passing the central hole, nuts on said bolts to secure the plate and lever in place, means for connecting the lower end of said lever and said draw bar, and a retractable pawl carried by the lever for engaging said toothed edge.

In testimony whereof I have hereunto set my hand.

ALEXANDER M. GREY.